United States Patent Office 3,411,543
Patented Nov. 19, 1968

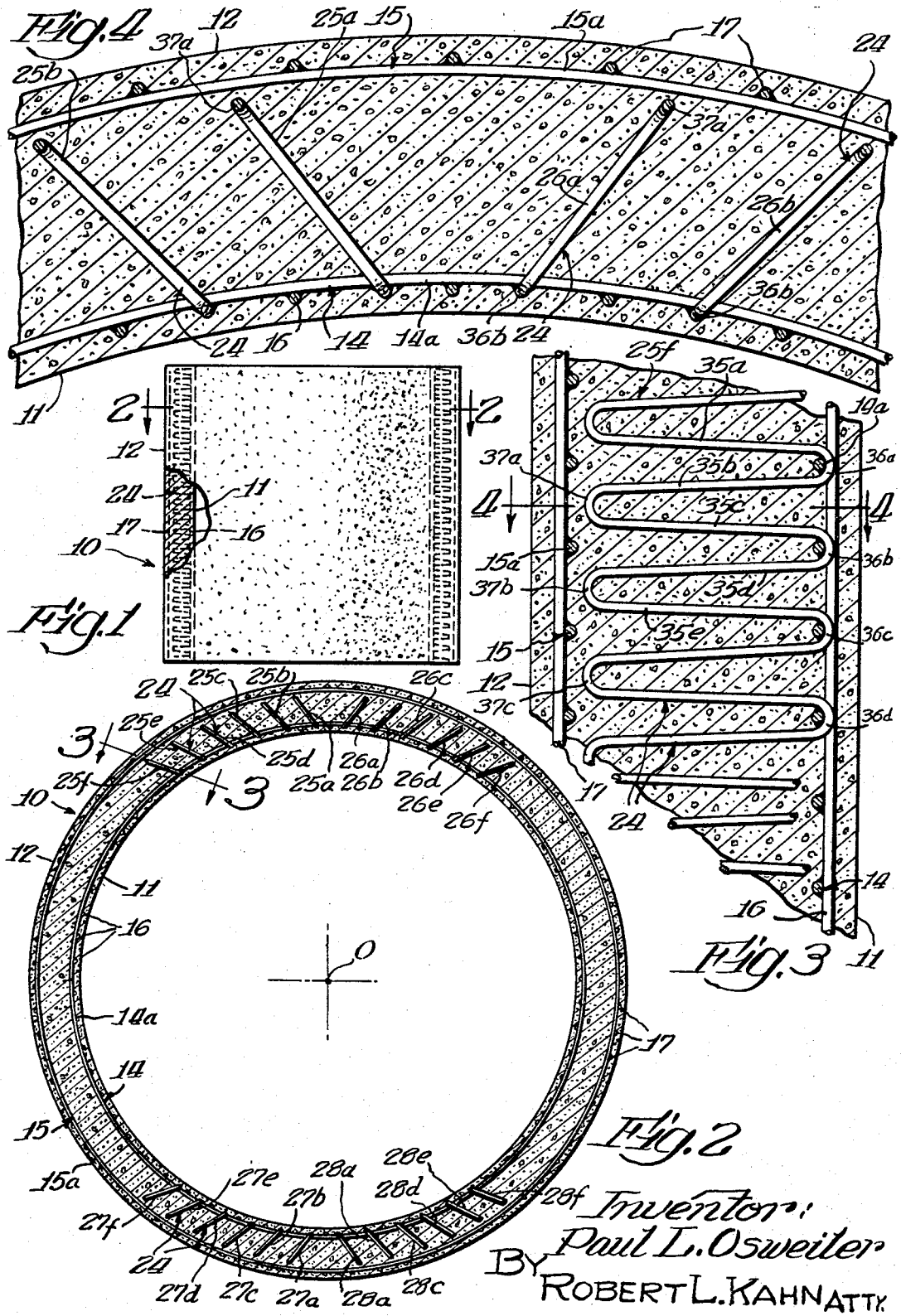

3,411,543
REINFORCED CONCRETE PIPE
Paul L. Osweiler, Dayton, Ohio, assignor to Price Brothers Company, Dayton, Ohio, a corporation of Michigan
Filed June 28, 1966, Ser. No. 561,150
2 Claims. (Cl. 138—175)

ABSTRACT OF THE DISCLOSURE

Large diameter concrete pipe has two generally cylindrical steel concentric cages for reinforcement within the concrete wall near the inner and outer pipe surfaces for the length of the pipe. Sinuous steel stirrups secured to the inner cage extend outwardly toward but short of the outer cage along about 60° or 70° of crown and invert regions of the pipe. The stirrups extend at an angle to the radii from the axis of the pipe toward the outer cage away from the vertical dividing plane of the horizontally installed pipe and symmetrically disposed with reference to said vertical plane. The tilt angle of each stirrup is about 35° or 45°.

This invention relates to reinforced concrete pipe and, more particularly, to large diameter concrete pipe ranging in size up from about 48 inches diameter and particularly 120 to 144 inches in diameter. The pipe embodying the present invention is provided with steel reinforcement for the purpose of resisting external loading (trench loading) but otherwise is not adapted for handling fluids under pressure. Pipes for handling the latter are generally designated as pressure pipe and are pre-stressed with tensioned steel reinforcement. The pipe embodying the present invention does not have any pre-stressing and is generally used for sewer and culvert purposes.

Pipe to which the present invention relates is usually buried in the ground and is subject to external loads. Such pipe, particularly in larger sizes, has normally untensioned steel cage reinforcement. As a rule, when two concentric steel cages are used, the inner and outer cages are disposed within the concrete generally within about 1 inch to 1½ inches from the inner and outer pipe surfaces respectively. A concrete pipe having such concentric cages will generally have a wall thickness ranging from about 5 inches to as much as 12 inches or more.

A pipe as disclosed above when buried in ground has to withstand not only its own weight but also that of ground material above the pipe and withstand pressure peaks resulting from road or street traffic. Such a pipe under load without benefit of any internal liquid pressure must resist a force tending to deform the pipe into the general shape of an ellipse whose major axis (spring line) is horizontal and whose minor axis (between crown and invert) is vertical. A stress analysis of such a pipe under load indicates (and this is borne out by experiment) that certain cage portions are tensioned and consequently result in arcuate steel rod tending to straighten. The reaction of the concrete medium containing the tensioned curved steel results in tension in the concrete.

As is well-known, concrete is weak in tension. Specifically, a pipe having concentric cages has the inside cage under tension at the crown and invert (top and bottom respectively of the pipe) while the outside cage is under tension at the spring line. Since the inside cage coils (as well as the outside cage coils) are curved with respect to the pipe axis, the tensioned steel tends to straighten. The concrete between the two cages is the only part of the pipe where any force for resisting this straightening may be present. At the crown and invert of a pipe, the bending of the pipe under load creates generally radial cracks in the concrete pipe wall extending from the inside pipe surface toward the outer pipe surface. The resulting tensile stress in the curved reinforcing steel bars creates radial tension in the concrete. Heavily reinforced sections often fail by peeling off the inner protective concrete allowing the steel to straighten. Similarly tension in the outer cage coils at the spring line creates generally radial cracks in the concrete pipe wall extending from the outer pipe surface inward toward the inner pipe surface.

In small pipe (pipe having a diameter less than about 5 feet) the steel reinforcing wires are small in diameter and strains on the concrete in the relatively thick wall are less. However, concrete pipe having an inside diameter ranging from about 5 feet or 6 feet under loads which may be moderate or even heavy (depending upon design specifications) will require heavy reinforcing steel. Such heavy reinforcing steel under tension and in the form of curved cages have large forces therein which are directed radially inward against the concrete. The increased magnitude of such forces coupled with proportionately less concrete for resisting such forces results in radial tension, failure of the pipe wall where in the inside concrete surface of the pipe in the plane of the inside cage is pulled off or slabbed by the inside cage straightening out.

Concrete pipes are customarily laid in a flat bottom ditch which places a concentrated line load along the invert of the pipe. In addition, pipes are frequently required by specifications to be tested in three-edge bearings which in effect places a concentrated line load parallel to the axis of the pipe along the crown and invert. These concentrated loads create tension stresses in the concrete which cause cracks at approximately 45° to the radius of the pipe. These are known as diagonal tension cracks and start at the inside face of the pipe and extend outwardly and toward the crown and invert at 45° to the pipe radius.

Large pipes under even moderate loads fail under radial tension or diagonal tension as described above or a combination of both. The concentrated load limit for a pipe depends upon which type of failure occurs first, that due to radial tension or to diagonal tension. In a conventional pipe both of these limits are determined by the tensile strength of the concrete which resists these forces to some degree. To increase the load capacity of the pipe requires engineering techniques to provide additional resistance to these forces. One such technique is to provide steel reinforcing across the planes where potential radial or diagonal tension cracks may occur and thereby increase the pipe strength. Such additional reinforcing in the past has been costly in materials and labor.

The present invention provides a pipe structure whose manufacture is simple and expeditious and whose steel is used so efficiently that a pipe having excellent load resisting characteristics and minimum steel may be fabricated. The invention makes it possible to handle inner and outer cages independently and permits final positioning of an inner and outer cage without danger of cage distortion or shifting.

The invention hereinafter disclosed is an improvement upon the co-pending application of Lewis R. Keyser, Ser. No. 561,272, filed June 28, 1966, and assigned to the same assignee. The invention generally contemplates the provision of sinuous steel stirrups rigidly secured to and extending from the inner cage coils at predetermined angles toward the outer cage coils, and almost reaching the outer cage, each stirrup extending longitudinally of the pipe and being securely attached only to the inner cage. In addition, the stirrups are disposed on angularly limited regions at the crown and invert. The construction is such that inner and outer cages including the stirrups may be prefabricated and finally positioned for pipe manufacture in a simple manner. The invention will now be described in connection with the drawings wherein:

FIG. 1 is an elevation of a finished pipe employing the present invention, some of the concrete being broken away for purposes of illustration.

FIG. 2 is a section along line 2—2 of FIG. 1.

FIG. 3 is an enlarged sectional detail on line 3—3 of FIG. 2.

FIG. 4 is an enlarged section on line 4—4 of FIG. 3.

Referring first to FIGS. 1 to 4 inclusive, concrete pipe 10 embodying the invention has inner and outer walls 11 and 12 respectively. Pipe 10 which may have a length generally of the order of 6 feet to 8 feet, or even less in larger diameters, will have an inside diameter of at least about 48 inches and more often have a diameter of from about 72 inches and up. With increasing pipe diameter, the greater become the advantages of the invention. The wall thickness between surfaces 11 and 12 will be at least 5 inches and will more likely range from about 6 inches or 7 inches up to as much as 12 inches and even more.

Pipe 10 has inner cage 14 and outer cage 15. Each cage may have a continuous helix or separate circular coils 14a and 15a respectively. Adjacent coils of a cage are retained in fixed relative position by longitudinal steel rods 16 and 17 for inner and outer cages respectively. The gauge of wire for the coils and rods of each cage and spacing between coils and rods will be determined by the load requirements for a pipe. Inasmuch as the same diameter pipe may be manufactured for different loads, it is possible for pipes having the same inside (or outside) diameters to have inner and outer cages of different gauges of steel and have the coils at different distances from each other and have the longitudinal rods 16 and 17 also at different distances from each other. The number of cage coils per foot length of pipe and the number and spacing of longitudinal rods (amount of steel) will depend upon design objectives.

In general, even with the invention herein disclosed, conventional engineering procedure can be used for determining the stresses to be encountered in the pipe and the amount of steel required. It is understood that each cage 14 and 15 will have the rods and coils welded together to form a conventional cage structure. In accordance with general practice, the inner and outer cages will be located substantially 1 inch from the inside and outside pipe walls. In some instances the spacing between a cage and adjacent pipe wall may be increased to about 1½ inches.

In accordance with the present invention, stirrups generally indicated by 24 are provided. As indicated in FIG. 2, the angle subtended from pipe axis O by each group of stirrups will be between about 60° and about 70° for both the crown or top portion of the pipe and the invert or bottom portion of the pipe. In some instances, the angle subtended by each group of stirrups may depart from this range by several degrees but, in general, best results are obtained within this range.

Stirrups 24 are disposed at spaced intervals in two groups at the crown and invert portions of the pipe. In general, the top group of stirrups will divide into two sub-groups symmetrically disposed with respect to the vertical axis of the pipe as laid. The number and spacing of individual stirrups in the sub-groups will depend upon engineering requirements. Stirrups 24 in the group disposed at the crown region of the pipe comprise individual stirrups 25a to 25f inclusive as one sub-group and 26a to 26f inclusive as the other sub-group. Similarly the stirrups at the invert region of the pipe consist of two sub-groups each one of which has stirrups 27a to 27f inclusive as one sub-group and 28a to 28f as the other sub-group.

Each stirrup generally indicated by 24 consists of a sinuous length of steel rod having generally straight portions 35a, 35b, 35c, etc. interconnected by bights or loops 36a, 36b, 36c, etc. at one tangent line and loops 37a, 37b, 37c, etc. at the other tangent line. Stirrup 24 has the 36 series of loops threaded about adjacent coils 14a of inner cage 14. Each stirrup loop enfolds a cage coil and at intervals of no more than about 16 inches, as measured along the cage length, is welded thereto. It is important that the stirrups be welded to the cage and that each stirrup sinuosity (comprising two straight parts and connecting loop) extend at an angle of between about 35° and 45° with reference to the radius from the center of the pipe, the slope of a sinuosity from the inner cage being away from the vertical axis of the pipe.

As illustrated in FIGS. 2 and 4, the 25 series of stirrups with reference to the inner cage will have their sinuosities sloping toward the left with reference to the vertical axis while the 26 series of stirrups will have their sinuosities sloping toward the right substantially at the same angle but away from the vertical axis. The 27 and 28 series of stirrups at the invert region of the pipe will similarly slope toward the left and right respectively of the vertical axis. It is understood that a stirrup extends for the entire length of a pipe so that each sinuosity or looped portion extending from the inner cage toward the outer cage should have the angular relationship specified. Within the range of 35° and 45°, the individual stirrup may vary somewhat in angularity although it is preferred to have all stirrups in all groups of a pipe sloping at about the same angle. Insofar as the angular extent of the entire group at the top or bottom of the pipe is concerned, the 60° or 70° extent of two sub-groups forming a group should be measured from the inner cage.

The individual stirrups should extend as near as possible to the cylindrical plane determined by the outer cage. The objective is to permit an outer cage to be telescoped without interference over an inner cage plus stirrups. It has been found that a clearance of ¼ inch between the free end loops in the 37 series of a stirrup and the metal of the outer cage will generally suffice. In the co-pending application of Keyser previously identified, the stirrups are disposed generally radially with respect to the inner cage as seen in a section similar to FIG. 2 of the drawings herein.

It has been found that a group of stirrups angled as herein disclosed provides reinforcing characteristics which, to some extent, are superior to the radial arrangement of the Keyser application. Due to the angling of the stirrups here, fewer stirrups can be used for the same load as when the stirrups are disposed radially. However, each stirrup will have to be heavier in this present arrangement as compared to the radial arrangement due to the fact that a stirrup as angled herein not able to resist radial tension as effectively as with the radial disposition of stirrups. Those stirrup pairs nearest to the vertical pipe axis (25a, 26a; 27a and 28a) can have a stirrup extend radially from the inner cage between each one of the pair; i.e. one radial stirrup between 25a and 26a and one radial stirrup between 27a and 28a. However, this is not essential, particularly if stirrups 25a and 26a start from regions on the inner cage which are close to the vertical axis, as about 1 inch or 1½ inches. The same applies to stirrups 27a and 28a.

It is not necessary that the free stirrup loops in the 37 series have any alignment with coils 15a of the outer cage. While it is preferred to have the loops or sinuosities of a stirrup extend normal to the pipe axis as viewed in FIG. 1 for example, some departure from this can be tolerated wherein a stirrup loop may tilt toward one pipe end or the other. No attempt has been made to show accurate proportions in the drawings since this is not practical.

The gauge of metal used for stirrups will depend upon the amount of reinforcement required. It is evident that stirrups may be pre-fabricated in indefinite lengths and are easily disposed in position in an inner cage. The stirrups and inner cage may be welded together while being held by jigs.

In a finished pipe embodying the present invention, a load normally has a tendency to develop cracks in the concrete wall at the crown and invert pipe regions. Such cracks frequently have a slope which makes their general direction generally perpendicular to the slope of the stirrups. Consequently, the stirrup reinforcement embodying the present invention has a tendency to inhibit any further development of cracks.

What is claimed is:

1. A concrete pipe having a substantially uniform wall thickness of at least about 5 inches and having inner and outer cylindrical surfaces with an inside diameter of at least of the order of about 4 feet, said pipe having steel reinforcement in the form of concentric inner and outer cylindrical cages disposed respectively within the concrete adjacent the inner and outer pipe surfaces, said cages being co-axial with said pipe and having generally circular coils spaced longitudinally along the pipe, and additional steel reinforcement for the length of said pipe at two limited arcuate portions of the pipe, said two arcuate portions defining respectively the crown and invert of said pipe when lying horizontal, said additional reinforcement being wholly within the pipe wall and bonded to the concrete and comprising a number of separate steel stirrups at each arcuate region, each stirrup being sinuous and, as viewed along a line normal to the pipe axis, extending longitudinally of the pipe with the sinuosity extending from the inner cage toward the outer cage, each stirrup having each coil of the inner cage embraced thereby and being welded to cage coils at intervals of no more than about 16 inches, the stirrup loops stopping short of the outer cage cylinder by a distance of about ¼ inch, there being two sub-groups of stirrups at each limited arcuate pipe portion, the angular extent of each of said limited arcuate portions of said pipe being generally no more than about 70°, each stirrup extending from the inner cage at an angle in the range of about 35° and 45° to a radius from the pipe axis as viewed transversely to the pipe axis, the slope from the inner cage being away from the vertical center line, the construction permitting said cages to be telescoped, adjusted and locked in desired relative positions prior to casting, said reinforcement being highly efficient for maximum strength with minimum steel.

2. For use in the manufacture of concrete pipe, whose inside diameter is at least about 5 feet with a wall thickness of at least about 5 inches, a generally cylindrical steel cage having generally circular coils spaced longitudinally of the cage cylinder, and a plurality of steel stirrups disposed in two groups at diametrically opposed arcuate regions, defining the crown and invert regions of a finished pipe, each stirrup being sinuous and extending longitudinally of the cage cylinder, with the sinuosity extending outwardly of the cage at an angle in the range of about 35° and 45° to a radius from the cage axis as viewed transversely thereto, the slope being away from the vertical center line bisecting said arcuate regions defining the crown and invert regions of the pipe, each stirrup having each coil of the cage enfolded thereby so that a stirrup loops about each cage coil with the stirrup length extending along the cage length and each stirrup loop extending outwardly from the cage for a distance such that the cylindrical surface containing the free loop ends has a radius which is no less than about ¼ inch short of the radius of an outer steel cage to be used in making a concrete pipe, the stirrup being attached at no more than 16 inch intervals to the inside cage by welding said stirrups having their surfaces adapted for bonding to concrete throughout the length of each stirrup, said stirrup groups each subtending a cylinder angle of between about 60° and about 70°.

No references cited.

SAMUEL ROTHBERG, *Primary Examiner.*

BRADFORD KILE, *Assistant Examiner.*